United States Patent
Gagnon

[15] 3,650,808

[45] Mar. 21, 1972

[54] POLYCARBONATE SURFACES HAVING TENACIOUSLY ADHERED ORGANOPOLYSILOXANE COATINGS THEREON AND PROCESS FOR MAKING

[72] Inventor: Donald W. Gagnon, 6802 Gaines Mill Drive, Sylvania, Ohio 43560

[22] Filed: Apr. 8, 1970

[21] Appl. No.: 26,803

[52] U.S. Cl. ..................117/72, 117/47 A, 117/138.8 F, 117/161 ZA
[51] Int. Cl. ....................................B44d 1/092, B32b 27/08
[58] Field of Search ..................117/72, 76 F, 76 T, 138.8 F, 117/13.8 A, 138.8 B, 47 A

[56] References Cited

UNITED STATES PATENTS

| | | | |
|---|---|---|---|
| 3,451,838 | 6/1969 | Burzynski et al. | 117/138.8 F X |
| 3,498,824 | 3/1970 | Chadha | 117/72 |
| 3,252,278 | 5/1966 | Marzocchi et al. | 117/72 X |
| 3,309,222 | 3/1967 | Caldwell | 117/138.8 F |
| 3,389,114 | 6/1968 | Burzynski et al. | 260/46.5 X |
| 3,389,121 | 6/1968 | Burzynski et al. | 260/46.5 |
| 3,414,540 | 12/1968 | Nugent et al. | 260/46.5 |
| 2,902,389 | 9/1959 | Keil | 117/72 |

*Primary Examiner*—William D. Martin
*Assistant Examiner*—Ralph Husack
*Attorney*—Robert F. Rywalski, Richard D. Heberling and E. J. Holler

[57] ABSTRACT

Process, and the article produced thereby, for providing a tenaciously adhered, hard, acetone-resistant and mar-resistant coating on articles having a polycarbonate surface. The process includes priming the polycarbonate surface with preferably gamma-aminopropyltriethoxysilane, then coating the primed surface with a solution of a solvent-soluble, further-curable organopolysiloxane in an organic solvent and thereafter evaporating the solvent and finally curing the organopolysiloxane. The solvent-soluble, further-curable organopolysiloxane is produced by heating methyltrialkoxysilane or a mixture of methyltrialkoxysilane and phenyltrialkoxysilane and water in the presence of a hydrolysis catalyst at a sufficient temperature and for a suitable time to form a partial condensation product, concentrating this product by heating to remove some alkanol by-product and water and thereafter precuring the product by heating below the gel point thereof.

14 Claims, No Drawings

POLYCARBONATE SURFACES HAVING TENACIOUSLY ADHERED ORGANOPOLYSILOXANE COATINGS THEREON AND PROCESS FOR MAKING

This invention generally relates to coatings for polycarbonate surfaces; more particularly it relates to organopolysiloxane coatings for polycarbonates and still more particularly it relates to a technique for providing uniformly and tenaciously adhered organopolysiloxane coatings on solid polycarbonate surfaces.

Polycarbonate resins, and substrates produced therefrom, are known to possess certain desirable properties which have been responsible for their use in various industries. The resins are typically transparent, noncorrosive, nontoxic, stain resistant, self-extinguishing, have low water absorption, fair impact strength, fair heat resistance, fair dimensional stability and desirable electrical properties. These resins have therefore been advantageously used as cable wrappings, slot liners, magnetic recording tape, sterilizable packages, lenses, viewing closures, for example, face plates, window applications and windshields, honeycomb cores and safety laminates. Unfortunately, however, because of certain detrimental characteristic properties of the polycarbonates, these resins have not achieved their full potential. The polycarbonates, for example, are known to possess a relatively soft surface and are consequently highly susceptible to marring and scratching, which, of course, is not acceptable if the ultimate use is as a windshield, face plate or the like.

In order to increase the utility of polycarbonates, coatings have been applied thereon. For example, in U.S. Pat. No. 3,451,838 organopolysiloxane coatings are applied onto polycarbonate surfaces, which coatings have many desirable properties, for example, they are clear, glossy, hard, mar-resistant, scratch-resistant. These coatings also exhibit excellent resistance to attack by polar organic solvents, for example, the ketones and especially acetone. Unfortunately, these organopolysiloxane coatings, though possessing many desirable properties, do not possess the desired degree of adherence to the polycarbonate resins. Thus, the organopolysiloxane coated polycarbonates would yet receive more use in the art if a technique could be devised for more tenaciously bonding the organopolysiloxane to the polycarbonate surface. This is especially true when the polycarbonates are intended for use as viewing closures, for example as a windshield or face plate.

With the foregoing in mind it is an object of this invention to produce tenaciously adhered organopolysiloxane coatings on polycarbonate surfaces.

Yet another object of this invention is to provide a method for increasing the adhesive bond of an organopolysiloxane to a polycarbonate substrate.

Yet another object of this invention is to tenaciously bond a thermoset organopolysiloxane onto a polycarbonate surface.

Still another object of this invention is to provide a tenaciously adhered hard, solvent-resistant, scratch-resistant, mar-resistant organopolysiloxane coating onto articles having a polycarbonate surface.

A still further object of this invention is to provide for organopolysiloxane coatings which are uniformly and tenaciously bonded to a polycarbonate surface.

According to one aspect of this invention, prior to the application of an organopolysiloxane to polycarbonate surface, the surface is primed by the application of a compound of the formula $H_2N—R_1—Si—(OR)_3$ wherein $R_1$ is an alkylene group of two carbon atoms or three carbon atoms, e.g., ethylene ($—CH_2—CH_2$) and propylene ($—CH_2—CH_2—CH_2—$) and wherein (OR) is an alkoxy group of from one to four carbon atoms, e.g., methoxy, isopropoxy, n-butoxy and the like. The priming may be done in any known manner for example by applying a solvent solution of $H_2N—R_1—Si—(OR)_3$ compound and then allowing the solvent to evaporate. Suitable solvents include water, lower aliphatic alcohols like the $C_1$–$C_5$ alcohols (methanol, butanol, isopropanol, n-pentanol are suitable), and aromatic solvents including benzene, toluene and the like.

According to a highly preferred aspect of this invention, a polycarbonate surface is primed with a gamma-aminopropyltrialkoxysilane generally represented by the structural formula $NH_2—(C_3H_6)—Si—(OR)_3$, wherein (OR) is an alkoxy group which includes one to about four carbon atoms such as for example methoxy, ethoxy, isopropoxy, butoxy and the like, R obviously being a $C_1$ to $C_4$ alkyl. Most advantageously the primer which is employed is gamma-aminopropyltriethoxysilane. The gamma-aminopropyltrialkoxysilane will advantageously be applied to the polycarbonate surface in a solvent solution by any conventional technique, for example spraying or dip coating. After the solvent solution application, the primed polycarbonate surface is allowed to set for a period of time, for example 15 minutes to about an hour, to allow the solvent to evaporate and thereby deposit a film of the gamma-aminopropyltrialkoxysilane on the polycarbonate surface. Many solvents may be used to apply the primer silanes for example water, aromatic solvents, like benzene, toluene and lower aliphatic alcohols, like the $C_1$–$C_5$ alcohols, or mixtures thereof. Methanol, butanol, isopropanol, ethanol and normal pentanol are quite satisfactory. The concentration of the gamma-aminopropyltrialkoxysilane priming solution is generally governed by economic considerations. Concentrations in the range of approximately 0.05% to 5% or 10%, or even higher, by weight gamma-aminopropyltrialkoxysilane have proved to be quite satisfactory. It will, of course, be understood that the lower concentration limit is generally based on the consideration that a sufficient thickness of the gamma-aminopropyltrialkoxysilane must be deposited on the polycarbonate surface to provide for the priming action; this in general only requires a thickness of approximately 1 micron or even less. The upper concentration limit, of course, is simply governed by economic considerations. After the polycarbonate surface has been primed with gamma-aminopropyltrialkoxysilane the primed surface is coated with a solvent solution of a solvent-soluble, further-curable organopolysiloxane, the solvent for the organopolysiloxane is then evaporated after which time the organopolysiloxane is finally cured to a thermoset state to provide a tenaciously adhered, hard, solvent-resistant, scratch-resistant, mar-resistant coating on the polycarbonate surface.

Advantageously, the solvent-soluble, further-curable organopolysiloxane which is employed is a hydrolysis and condensation product of methyltrialkoxysilane, wherein the alkoxy group contains from one to five carbon atoms, like methoxy, isopropoxy, and pentoxy. This solvent-soluble, further-curable organopolysiloxane is prepared by a process wherein methyltrialkoxysilane is hydrolyzed with water (at least about 1.5 moles of water per mole of silane) in the presence of a hydrolysis catalyst, e.g., HCL, for about 1 to 10 hours at a temperature generally between about 40° C. and reflux temperature, preferably within the temperature range of about 50° to 90° C. to produce a partial condensation product; the partial condensation product is then concentrated by heating to about 65° to 300° C. and preferably within the temperature range of about 70° to 150° C. to remove some alkanol byproduct and water; the concentrated product is then precured at a temperature of about 70° to 300° C. and below the gel point thereof and then solidified to provide a solid solvent-soluble, further-curable organopolysiloxane. The solid solvent-soluble, further-curable organopolysiloxane is then dissolved, for example to a concentration of about 5 to 85 percent by weight, in a suitable solvent and the solution then applied to the primed polycarbonate surface, after which the solvent is evaporated and the organopolysiloxane finally cured to provide a glossy, tenaciously adhered, hard, solvent-resistant, mar-resistant, scratch-resistant thermoset coating on the polycarbonate surface. The solidification referred to above may comprise cooling or may include the flaking or spray drying techniques respectively disclosed in U.S. Pat. Nos. 3,414,540 and 3,383,773. Optionally, instead of solidifying the precured organopolysiloxane to provide a solid, solvent-soluble, further-curable organopolysiloxane, the solidification may be omitted and the precured organopolysiloxane dissolved in a suitable solvent and then applied to the primed polycarbonate surface.

Another solvent-soluble, further-curable organopolysiloxane which is advantageously applied to the primed polycarbonate surface is the hydrolysis and condensation product of a mixture of methyltrialkoxysilane and phenyltrialkoxysilane wherein the alkoxy group contains one to five carbons, like methoxy, propoxy, n-pentoxy, etc. This organopolysiloxane is prepared by a process wherein a mixture of methyltrialkoxysilane and phenyltrialkoxysilane is hydrolyzed with water (at least about 1.5 moles water per mole of total silane) in the presence of a hydrolysis catalyst, e.g., HCL, for about 1 to 10 hours at a temperature between ambient and reflux to produce a partial condensation product, the partial condensation product is then concentrated by heating to remove about 50 to 90 mole percent alkanol byproduct in some water; the concentrated product is then precured at a temperature of about 70° to 400° C., usually less than about 250° C., and below the gel point thereof and then solidified to provide a solid, solvent-soluble, further-curable organopolysiloxane. The solid, solvent-soluble, further-curable organopolysiloxane is then dissolved, for example to a concentration of about 5 to 85 percent by weight, in a suitable solvent and the solution then applied to the primed polycarbonate surface after which time the solvent is evaporated and the further-curable, solvent-soluble organopolysiloxane finally cured to provide a tenaciously adhered, hard, scratch-resistant, mar-resistant, solvent-resistant, glossy, thermoset coating on the polycarbonate surface. As indicated above, the solidification may comprise cooling or include the flaking or spray drying techniques respectively disclosed in U.S. Pat. Nos. 3,414,540 and 3,383,773. Additionally, as indicated above, instead of solidifying the precured, further-curable, solvent-soluble organopolysiloxane the precured product may be dissolved in a suitable solvent and then applied to the primed polycarbonate surface.

Particularly suitable silanes which are employed to produce the solvent-soluble, further-curable organopolysiloxanes discussed above are methyltriethoxysolane and a mixture of methyltriethoxysilane and phenyltriethoxysilane. For further details regarding the preparation of the solvent-soluble, further-curable organopolysiloxanes which are advantageously employed in producing polycarbonate coated articles reference may be had to U.S. Pat. Nos. 3,389,114 and 3,389,121 both of which are hereby incorporated by reference. Additionally, U.S. Pat. Nos. 3,383,773 and 3,414,540 relating to the preparation of the solid solvent-soluble, further-curable organopolysiloxanes are also hereby incorporated by reference.

In passing, it should be mentioned that the solution of the further-curable, solvent-soluble organopolysiloxane may include suitable adjuvants such as fillers, colorants and dopants. In certain instances, it may be desirable to include in the solution about 1 to about 5 percent by weight (of the organopolysiloxane solids) of an ultraviolet light absorbing compound like 2-hydroxy-4-methoxybenzophenone or 2,2'-dihydroxy-4-methoxybenzophenone. Organic acids such as tartaric, gluconic or citric acid may also be incorporated in the organopolysiloxane to increase the weather resistance and alter the flexibility of the resulting thermoset organopolysiloxane; in this regard reference may be had to U.S. Pat. No. 3,457,221. Additionally, the organopolysiloxane which is applied to the primed polycarbonate surface may be modified by a polyamide which is an alkoxy alkyl-substituted condensation polymer in which alkoxymethyl groups replace the amide hydrogen in the polyamide chain; these compositions will have outstanding flexural properties and are disclosed in U.S. Pat. No. 3,457,323.

The polycarbonate surfaces which are advantageously primed and coated in accordance with this invention are the well-known solid polycarbonates. They are described, for example in the Kirk-Othmer Encyclopedia of Chemical Technology, Second Edition, Vol. 16 at pages 106–116 and are additionally discussed in the Encyclopedia of Polymer Science and Technology, Vol. 10 at pages 710–764, (Copyright in 1969 John Wiley and Sons, Inc.). Most advantageously the solid polycarbonates which are employed in accordance with this invention are of the polyaryl carbonate type having a number average molecular weight of about 16,000 to about 24,000 or higher. This type of polycarbonate is represented by the following structural formula

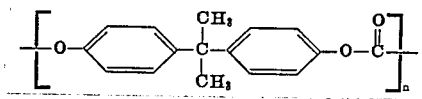

wherein $n$ is an integer in the range of about 60 to about 90. These polycarbonates are commercially available and one such suitable polycarbonate is that commercially supplied under the trademark "Lexan."

In passing, it should be mentioned that the polycarbonates have also been primed by using a conventional flame treating technique or a conventional acid etching technique. These two types of priming techniques are not entirely satisfactory, however, in that they produce spotty results. That is, the adhesion is not uniform in that in certain areas the organopolysiloxanes will be found to be more strongly bonded than in other areas. Presumably, this is the result of a nonuniform priming of the surface. By priming the polycarbonates as contemplated in this invention it will be found however, that a much more uniform, tenacious bond of the organopolysiloxane to the polycarbonate substrate will be produced. It is worth mentioning that the primers employed in this invention to produce uniform, tenaciously coated polycarbonate surfaces, do not produce this outstanding priming effect on all polymers; for example this priming effect is not realized when the same primers are used to prime solid acrylic surfaces.

The following examples are illustrative of the manner practicing this invention, it, of course, being understood that the examples are not to be construed as limiting the invention but merely set forth the exemplary manner of using this invention.

EXAMPLE I-A

A solvent-soluble, further-curable organopolysiloxane prepolymer product was prepared by hydrolyzing and condensing about 1 mole of methyltriethoxysilane with about 2 ½ moles of water and about 3 weight parts of HCl per million parts of water and silane, the silane first being purified by distillation to about zero parts per million of HCL.

The reaction mixture was heated with agitation in a flask equipped with a condenser until the pot temperature reached about 80° C. This temperature was maintained for about 4 hours. After about 20 minutes, the two phase reaction mixture clarified to a one phase system due to the ethanol liberated in the reaction acting as a mutual solvent. At the end of the 4 hour period approximately 78 grams of an ethanol-water mixture (about 92 percent alcohol) was removed by distillation. The hydrolysis and condensation reaction, and concentration thereafter, produced a viscous liquid. The viscous liquid prepolymer was refluxed at 50 percent solids for 20 hours to increase the viscosity to 30 centipoises at 50 percent solids at 20° C. in ethanol.

The viscous liquid having a viscosity of about 30 centipoises at 50 percent solids at 25° C. in ethanol was further treated and precured by forming a film thereof and heating the film in a wiped film evaporator. The evaporator was operated at a wall temperature of about 200° C. which provides a product temperature of about 160° C. The main residence time in the evaporator was about 20 seconds. The resultant liquid precured material was solidified in about 1 to 1 ½ minutes and broken up into flakes by a drum flaker unit. These flakes of the solvent-soluble, further-curable organopolysiloxane were then dissolved in normal-butanol to a resin solid concentration of about 40 percent by weight. The resultant solution was then filtered to remove possible contaminants such as dust, and dirt.

EXAMPLE I-B

A priming solution of gamma-aminopropyltriethoxysilane was prepared to a concentration of about 1 percent by weight of the silane in normal-butanol. Into this solution there was then dipped a clear, generally rigid polycarbonate substrate having a thickness of about one-eighth inch and characterized by the repeating structural unit

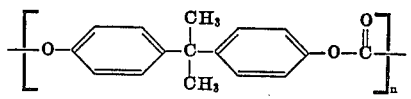

This type of polycarbonate is commercially available and supplied under the trademark "Lexan". The polycarbonate substrate was then removed from the gamma-aminopropyltriethoxysilane solution and was allowed to remain in the open air for about 45 minutes during which time the normal-butanol solvent evaporated and thereby deposited a thin film of a gamma-aminopropyltriethoxysilane on the polycarbonate substrate.

The gamma-aminopropyltriethoxysilane primed polycarbonate substrate was then dipped into the 40 percent organopolysiloxane solution as prepared in I-A above. While dipping constitutes one mode of coating the substrate it, of course, will be apparent that other conventional coating techniques such as, for example spray, roller or flow coating techniques may also be employed. The gamma-aminopropyltriethoxysilane primed polycarbonate substrate, which had now been dip coated as above, was allowed to remain in the open air for a sufficient time to allow the solvent to evaporate and the resulting organopolysiloxane coating was then cured to a thermoset condition by heating at 270° F. for about 30 minutes in a forced air circulating oven. The resulting thermoset organopolysiloxane coating had a thickness of about one-half to three-fourths mils. Another similarly coated polycarbonate substrate was cured for 10 hours at 200° F. and produced a coating have approximately the same thickness as referred to above. Both coated substrates were tested in the manner hereinafter to be described and produced equivalent results.

The polycarbonate substrates which now possess a clear, glossy, thermoset organopolysiloxane coating thereon were then tested to determine the adhesion, acetone resistance, and hardness of the coated surface.

The acetone resistance was determined by wiping the coated surface with a tissue which had been saturated with acetone and then visually observing the coated surface after it had dried. If the coating becomes cloudy the acetone resistance is generally designated as poor whereas if there is not deterioration in the coatings' appearance an excellent designation is employed. The polycarbonate substrates having the clear, glossy, cured organopolysiloxane resin coating showed excellent acetone resistance. That is, the clear coating showed no signs of cloudiness after the acetone wiping.

The adhesion of the coating is determined by scribing an X in the coated surface and then applying adhesive tape to the scribed section. Upon pulling of the tape, if there is no noticeable removal of the coating, it is designated excellent. No coating removal was discernible when the primed coated substrates of this example were so tested. In contrast, when a similar polycarbonate substrate is coated without employing the gamma-aminopropyltriethoxysilane primer substantial portions of the resulting thermoset organopolysiloxane coating are removed when employing this same test procedure.

The hardness of the polycarbonate coated substrates was then determined by a so-called pencil-hardness test. According to this test two steps are involved. First of all, the fingernail is firmly translated along the coating and if the coating mars the test is discontinued and the coating is deemed to have poor hardness. If, on the other hand, no marring is produced graphite pencils of increasing hardness are successively drawn across the coated surface until a noticeable scribing or surface penetration appears. The pencil, or graphite hardness producing the scribe thus becomes the coating hardness designation. The coatings as produced hereinbefore have a hardness of approximately 7H which is considered excellent.

In passing, it should be mentioned that the curing of the organopolysiloxane was observed to require slightly less time than is normally encountered when a gamma-aminopropyltrialkoxysilane primer is not employed. That is, it appears that in spite of the fact that the gamma-aminopropyltriethoxysilane was deposited as a film on the polycarbonate substrate nonetheless a slight catalytic curing effect was observed.

EXAMPLE II

The procedure as set forth in Example I-A and I-B was generally repeated with the exception that instead of employing a further-curable, solvent-soluble organopolysiloxane which had been manufactured from a methyltriethoxysilane precursor the further-curable, solvent-soluble organopolysiloxane employed in this example was the prepolymer prepared from a mixture of methyltriethoxysilane and phenyltriethoxysilane. In general, the results as set forth in Example I-B were identical employing the methyltriethoxysilane and phenyltriethoxysilane precursors.

The specific further-curable, solvent-soluble organopolysiloxane prepolymer was prepared from methyltriethoxysilane and phenyltriethoxysilane using two moles of the methyl precursor silane and one mole of the phenyl precursor silane. The mixture of methyl and phenyltriethoxysilanes was hydrolyzed and condensed with 9 moles of water (3 moles of water/mole of total silane) and about 2.5 parts of HCl per million parts of water and silane, the silanes first being purified by distillation to about 0 parts per million HCl.

The reaction mixture was heated with agitation in a flask equipped with a condenser until the pot temperature reached about 80° C. This temperature was maintained for 4 hours. After about 20 minutes, the two phase reaction mixture clarified to a one phase system due to the ethanol liberated in the reaction acting as a mutual solvent. At the end of the 4 hour period, approximately 282 grams of an ethanol-water mixture (about 92 percent alcohol) was removed by distillation. The hydrolysis and condensation reaction and the concentration by removal of alkanol byproduct and water thereafter produced a viscous liquid. The viscous liquid, having a viscosity of about 40 centipoises and 60 percent solids at 25° C. in ethanol was refluxed for 15 hours to provide the same with a heat history and a final viscosity of about 60 centipoises at 60 percent solids at 25° C.

The liquid was then precured in a wiped film evaporator operating at about 195°–200° C. wall temperature to provide a liquid product temperature of about 170°–175° C. for mean residence time of less than 40 seconds, namely about 20 seconds. The resultant precured material was chilled and solidified in about 60 seconds by passing the liquid through a drum flaker. The liquid was solidified into sheets which were broken up into flakes which had a melting point of about 55° C. and were substantially free from gel. These flakes were then employed in the manner set forth in Example I-A and I-B and the same results were obtained. That is, the resulting coatings on the primed polycarbonate surface showed excellent hardness, acetone resistance and adhesion.

While the above examples set forth the best mode contemplated in practicing this invention it will, of course, be apparent that modification is possible. For example, while normal-butanol was used as the solvent for the solvent-soluble, further-curable organopolysiloxane it will be apparent that other solvents may likewise be employed. For example, acetone, methylisobutylketone, methanol, ethanol, isobutanol, ethylacetate, dioxane, ethyleneglycolmonomethylether, ethyleneglycolmonoethylether, ethyleneglycolmonobutylether, and the like may also be employed.

In general, the final cure of the further-curable, solvent-soluble organopolysiloxane will be effected by heating to a temperature of about 100° to about 135° C. for a period of time of between ½ hour to about 24 hours. The time and temperature, of course, may be varied in other ranges so long as the polycarbonate substrate which is employed is capable of withstanding the specific heating intensity employed. That is, the curing is done under conditions of time and temperature which will not cause any degradation in the properties of the polycarbonate substrate. Additionally, if desired, the organopolysiloxanes may be catalyzed by the addition of a suitable catalyst thereto. In this regard, not only does gamma-aminopropyltrialkoxysilanes function as excellent primers for a polycarbonate surface but these same materials may be added to the solvent-soluble, further-curable organopolysiloxanes to catalyze the curing rate.

While the invention has been described above with particularity, it will, of course, be apparent that modifications may be made which pursuant to the patent statutes and laws do not depart from the spirit and scope of the invention. Accordingly, the scope of the invention is as defined in the following claims.

I claim:

1. A process for producing an article having a polycarbonate surface which is coated to provide a uniformly and tenaciously adhered, hard, mar-resistant, scratch-resistant, heat-resistant and acetone-resistant coated surface, the process comprising the steps of:
   A. priming said polycarbonate surface with a compound of the formula $H_2N—R_1—Si—(OR)_3$ wherein $R_1$ is an alkylene group of two or three carbon atoms and R is an alkyl group containing between one and four carbon atoms,
   B. applying a solution of a solvent-soluble, further-curable organopolysiloxane in an organic solvent on the primed polycarbonate surface, said further-curable organopolysiloxane being a precured hydrolysis and condensation product of a silane of the group consisting of methyltrialkoxysilane and a mixture of methyltrialkoxysilane and phenyltrialkoxysilane in which the alkoxy group contains from one to five carbon atoms, said organopolysiloxane being prepared by heating said silane and water in the presence of a hydrolysis catalyst for about 1 to about 10 hours at a temperature between about 40° C. and reflux to produce a siloxane partial condensation product, concentrating said siloxane partial condensation product by heating to remove about 50 to 90 mole percent alkanol byproduct and some water, and precuring the concentrated product by heating below the gel point thereof to provide said solvent-soluble, further-curable organopolysiloxane, and
   C. evaporating the solvent for said organopolysiloxane and finally curing said organopolysiloxane to provide a thermoset coating on said polycarbonate surface.

2. The process of claim 1 wherein said compound of the formula $H_2N-R_1-Si-(OR)_3$ is gamma-aminopropyltrialkoxysilane, wherein said alkoxy group contains from one to four carbon atoms.

3. The process as defined in claim 2 wherein said gamma-aminopropyltrialkoxysilane is gamma-aminopropyltriethoxysilane.

4. The process as defined in claim 3 wherein the alkoxy groups of said methyltrialkoxysilane and said phenyltrialkoxysilane are ethoxy groups.

5. The process as defined in claim 2 wherein said solvent-soluble, further-curable organopolysiloxane is a hydrolysis and condensation product of methyltriethoxysilane.

6. The process as defined in claim 2 wherein said solvent-soluble, further-curable organopolysiloxane is a hydrolysis and condensation product of a mixture of methyltriethoxysilane and phenyltriethoxysilane.

7. The process of claim 2 wherein said polycarbonate is characterized by a reoccurrence of the following structural unit:

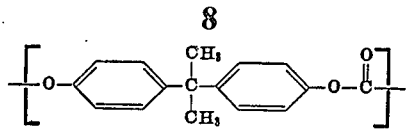

8. The article produced by the process of claim 1.

9. A process for producing an article having a solid polycarbonate surface which is coated to provide a uniformly and tenaciously adhered, hard, mar-resistant, heat-resistant and acetone-resistant coated surface, the process comprising the steps of:
   A. priming said surface with gamma-aminopropyltriethoxysilane,
   B. applying a solution of a solvent-soluble, further-curable organopolysiloxane in an organic solvent on the primed polycarbonate surface, said further-curable, solvent-soluble organopolysiloxane being a precured hydrolysis and condensation product of methyltrialkoxysilane in which the alkoxy group contains between one and five carbon atoms and being prepared by heating said silane and water in the presence of a hydrolysis catalyst for about 1 to 10 hours at a temperature between about 40° C. and reflux to produce a siloxane partial condensation product, concentrating said partial condensation product by heating to a temperature within the range of about 65° to 300° C. to remove alkanol byproduct and some water, precuring the concentrated product by heating at a temperature of between about 70° to 300° C. and below the gel point thereof to provide said solvent-soluble, further, curable organopolysiloxane, and
   C. evaporating the solvent for said organopolysiloxane and finally curing said organopolysiloxane to provide a thermoset coating on said polycarbonate surface.

10. The process as defined in claim 9 wherein step A comprises the step of applying a solution of gamma-aminopropyltriethoxysilane onto said polycarbonate surface, and allowing the solvent of said solution to evaporate.

11. The process as defined in claim 10 wherein said methyltrialkoxysilane is methyltriethoxysilane.

12. A process for producing an article having a polycarbonate surface which is coated to provide a hard, mar-resistant, tenaciously and uniformly adhered, heat-resistant and acetone-resistant coated surface, said process comprising the steps of:
   A. priming said polycarbonate surface with gamma-aminopropyltriethoxysilane,
   B. applying a solution of a solvent-soluble, further-curable organopolysiloxane in an organic solvent on the primed polycarbonate surface, said further-curable organopolysiloxane being a precured hydrolysis and condensation product of a mixture of methyltrialkoxysilane and phenyltrialkoxysilane in which the alkoxy groups contain between one and five carbon atoms, said organopolysiloxane being prepared by heating said silane and water in the presence of a hydrolysis catalyst for about 1 to about 10 hours at a temperature between ambient and reflux to produce a siloxane partial condensation product, concentrating the partial condensation product by heating to remove about 50 to 90 mole percent alkanol byproduct and some water, precuring the concentrated product at a temperature between about 70° and 250° C. and below the gel point thereof to provide said solvent-soluble, further-curable organopolysiloxane, and
   C. evaporating the solvent for said organopolysiloxane and finally curing said organopolysiloxane to provide a thermoset coating on said polycarbonate surface.

13. The process as defined in claim 12 wherein step A comprises forming a film of gamma-aminopropyltriethoxysilane on said polycarbonate surface.

14. The process as defined in claim 13 wherein said solvent-soluble, further-curable organopolysiloxane is a hydrolysis and condensation product of a mixture of methyltriethoxysilane and phenyltriethoxysilane.

UNITED STATES PATENT OFFICE
CERTIFICATE OF CORRECTION

Patent No. 3,650,808       Dated March 21, 1972

Inventor(s) Donald W. Gagnon

It is certified that error appears in the above-identified patent and that said Letters Patent are hereby corrected as shown below:

Column 1, line 65, should be -- $CH_2-CH_2-$) and propylene ($-CH_2-CH_2-CH_2-$) and --. Column 2, line 42, "in" should be -- is --. Column 2, line 49, after "e.g.," the formula "HCL" should be -- HCl --. Column 3, line 10, after "e.g.," the formula "HCL" should be -- HCl --. Column 3, line 38, "methyltriethoxysolane" should be -- methyltriethoxysilane --. Column 4, line 47, "HCL" should be -- HCl --. Column 4, line 67, "main" should be -- mean --. Column 5, line 53, "not" should be -- no --. Column 7, line 48, before "90" insert -- about --.

Signed and sealed this 15th day of August 1972.

(SEAL)
Attest:

EDWARD M. FLETCHER, JR.
Attesting Officer

ROBERT GOTTSCHALK
Commissioner of Patents